Feb. 15, 1944.    V. W. BREITENSTEIN    2,341,526
AMPLIFYING AND DETECTING SYSTEM
Filed July 8, 1939    3 Sheets-Sheet 1

Inventor
Victor W. Breitenstein
By Williams, Bradbury,
McCaleb & Hinkle
Attys Feb. 15, 1944.   V. W. BREITENSTEIN   2,341,526
AMPLIFYING AND DETECTING SYSTEM
Filed July 8, 1939   3 Sheets-Sheet 2

Inventor
Victor W. Breitenstein

Feb. 15, 1944. V. W. BREITENSTEIN 2,341,526
AMPLIFYING AND DETECTING SYSTEM
Filed July 8, 1939 3 Sheets-Sheet 3

Inventor.
Victor W. Breitenstein
By Williams, Bradbury,
McCalet & Hinkle
Attys.

Patented Feb. 15, 1944

2,341,526

UNITED STATES PATENT OFFICE 2,341,526

AMPLIFYING AND DETECTING SYSTEM

Victor W. Breitenstein, Chicago, Ill., assignor to Illinois Testing Laboratories, Inc., Chicago, Ill., a corporation of Illinois Application July 8, 1939, Serial No. 283,335

3 Claims. (Cl. 171—242)

The present invention relates to amplifying and detecting systems, and is particularly concerned with such systems which are adapted to be used as magnetic amplifiers, relay amplifiers, detectors for control bridges, and potentiometers to be used as indicators, automatic controllers, recorders, or other devices responsive to low input energy levels.

One of the objects of the invention is the provision of an improved magnetic amplifying system having a greater gain and sensitivity per stage of amplification than has been possible with the devices of the prior art.

Another object of the invention is the provision of a system of the class described which utilizes a minimum power consumption for its operation.

Another object of the invention is the provision of a system of the class described including control devices having a lock-in function, selective response depending on polarity; response at predetermined current or power levels, and other desirable features.

Another object is the provision of an improved control system in which the response and output of the first stage are so critical, positive, and of such amplitude or high power level that operation of the system is unaffected by minor changes in characteristics of the following stages.

Another object is the provision of an amplifier which utilizes the amplifying effects of a resonant circuit in which the inductance is a saturable core reactor operating at a point on the saturation curve at which the largest change of output due to a change in the D. C. input happens to coincide with resonance of the circuit.

Another object is the provision of an amplifier which has the inherent supervisory feature relating to the input circuit whereby any break or discontinuity in the input circuit is indicated.

Other objects and advantages of the invention will be apparent from the following description and the accompanying drawings, in which similar characters of reference indicate similar parts throughout the several views.

Referring to the drawings.

Figure 1:
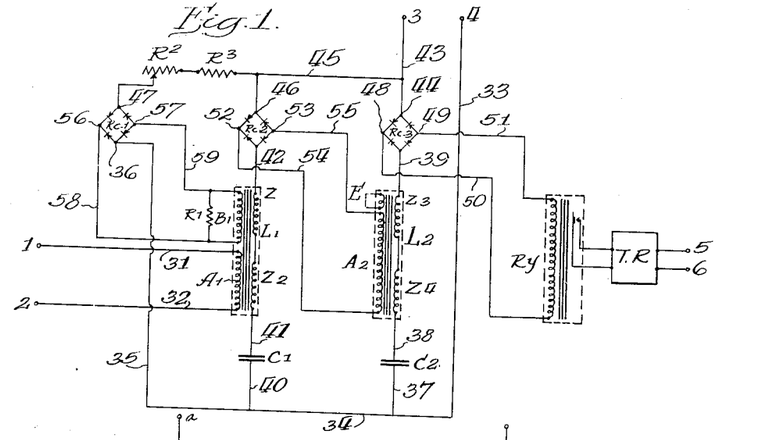
Fig. 1 is a wiring diagram of an amplifying system embodying the invention for an input derived from a high impedance source, such as a gaseous photocell.

Referring to Fig. 1, this is a wiring diagram of an amplifying circuit for a high impedance input. The circuit includes one or more saturable iron core reactors, generally indicated by $L_1$ and $L_2$, the structure of which is also diagrammatically shown in Fig. 5.

Figure 5:
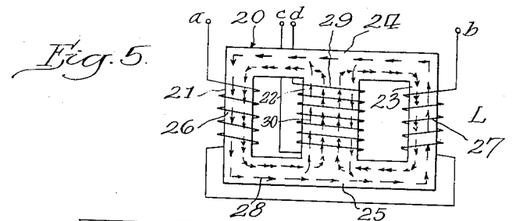
Fig. 5 is a diagrammatic illustration of an iron core reactor of the type utilized in the present system.

The reactors are of the type having a closed magnetic circuit, and preferably include three legs for receiving coils, such as the core 20 of Fig. 5, having the legs 21, 22, 23 joined by the side portions 24 and 25 of the core. The central leg 22 is preferably of twice the cross-sectional area of either one of the end legs 21 and 23, so that the cross section of the central leg is equal to the sum of the cross sections of the end legs.

The reactor is provided with balanced windings, including the windings 26 and 27 on the legs 21 and 23, connected in series, and in the same direction of rotation, considering the magneto-motive turns of the coils as producing a flux extending in the same direction about the outer circuit of the core, as shown by the arrows 28. The terminals of these balanced windings may be indicated by $a$ and $b$, for association with similar terminals in other circuits.

The central leg is provided with a winding 29, which has the terminals indicated by $c$ and $d$, and the winding 29 is made in such a direction as to produce a flux in the direction of the arrows 30, pointing upward in Fig. 5.

The two outer legs are surrounded by the alternating current or reactance coils, series connected in such a way that the alternating current flux produced by these two coils in the center leg are opposing or cancelling each other, making the center leg alternating current fluxless. The center leg holds the direct current or Ho-coil and no transformer action takes place between this and the alternating current coils as long as no direct current is superimposed.

The size of the parts of the core in relation to the ampere turns is important, and therefore one example of the sizes and structure of the core is given, as follows.

Figure 4:
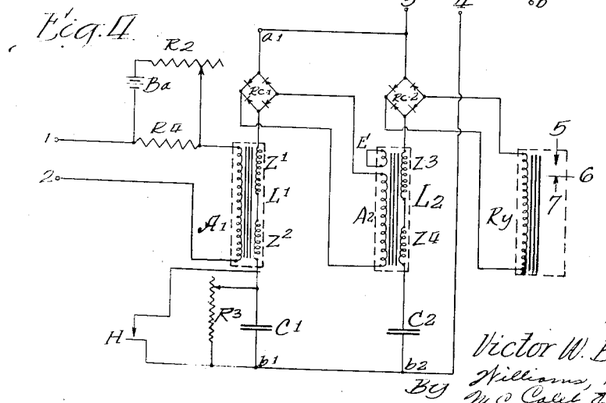
Fig. 4 is a wiring diagram of another complete amplifier, for an input derived from a low impedance source, as a thermocouple.

For example, in both circuits Figs. 1 and 4, the reactors $L_1$ and $L_2$ are preferably made of laminations of Allegheny Mu-Metal, the laminations being $2'' \times 1^3/_{16}''$ overall, and the height of the stack being $\frac{1}{2}''$. The outer legs, for example, may be $\frac{1}{4} \times \frac{1}{2}''$ in cross section, the center leg may be $\frac{1}{2} \times \frac{1}{2}''$, and the window area may be $2 \times 1^3/_{16} \times \frac{1}{2}$. The reactance windings for the reactors of both circuits are alike and are indicated by the impedance letters $Z_1$, $Z_2$, $Z_3$, and $Z_4$, corresponding to the windings on the external legs 21 and 23 of the core reactor, which have been given the numerals 26 and 27 in Fig. 5.

For example, in Figs. 1 and 4 the reactance windings $Z_1$ and $Z_2$ may consist of 1,000 turns of No. 32 wire, having a resistance of 26 ohms. The reactance windings $Z_3$ and $Z_4$ of Figs. 1 and 4 may comprise 400 turns of No. 29 wire having a resistance of 5 ohms. In both of the circuits Figs. 1 and 4 the control windings $A_2$ of the second core reactor $L_2$ are the same and may consist of 3600 turns No. 34 wire having a resistance of 200 ohms, and these coils are wound on brass coil forms, thus providing a short-circuited coil circuit, indicated by the letter E, in the second stage of Figs. 1 and 4, at the top of reactor $L_2$.

The relays $R_y$ of Figs. 1 and 4 may consist of an iron core relay having a 200 ohm coil which closes its circuit at 12 m. a. and opens at 8 m. a.

The current swing of the output of the second stage in each of these circuits may be from 5 to 16 m. a., and if the circuit is energized and operated in such manner as to cause what I call a "transition," occurring in the first stage, it will be evident that the change of current in the relay circuit is such that there is a positive and certain actuation of the relay in the controlling of the output circuit, which may be indicated by the numerals 5 and 6 in Figs. 1 and 4.

The numeral 7 also indicates a contact in Fig. 4 in the control circuit at which contact is broken. The numerals 1 and 2 in Figs. 1 and 4 indicate what may be termed the signal input terminals of the amplifying or controlling circuit, and in Fig. 1 the terminals 1 and 2 are directly connected by conductors 31 and 32 to the terminals of the control coil $A_1$.

The control coil $A_1$ corresponds to the direct current coil 29 of the reactor shown in Fig. 5, which I prefer to call the Ho-coil. The circuit is energized for operation by means of the terminals 3 and 4 at the top of Figs. 1 and 4 by means of 60 cycle alternating current of from 5.2 to 5.8 volts, when the circuits are operated under a condition which is later explained hereing as the Case 1 condition (oscillating).

The conductor 33 leads from the terminal 4 and extends horizontally at 34 in the diagram and upward at 35 to the point 36, where it is connected to one of the A. C. input terminals 36 of a copper oxide full wave bridge-type rectifier. The horizontal portion of the conductor 34 is connected by 37 to one of the terminals of a condenser $C_2$, the other terminal of the condenser being connected by conductor 38 to the terminal of coil $Z_4$.

Coil $Z_4$ is in series with coil $Z_3$ (Fig. 1), and is connected by conductor 39 to one of the alternating current input terminals of a copper oxide full wave rectifier. The conductor 34 is also connected by conductor 40 to a terminal of the condenser $C_1$, the other terminal of which is connected by conductor 41 to the terminal of coil $Z_2$.

Coil $Z_2$ is connected in series with coil $Z_1$, the other terminal of which is connected by conductor 42 to one of the alternating current input terminals of a copper oxide full wave rectifier. These copper oxide rectifiers may be indicated by the letters $R_{c-1}$, $R_{c-2}$, and $R_{c-3}$.

The terminal 3 is connected by conductor 43 to the other alternating current input terminal 44 of the copper oxide rectifier $R_{c-3}$. A horizontal conductor 45 of the diagram of Fig. 1 connects terminal 3 also to the alternating current input terminal of the rectifier $R_{c-3}$, at 46.

The resistances $R_2$ and $R_3$ are interposed between the conductor 45 and the connection of this conductor to the rectifier $R_{c-1}$ at 47, one of these resistances being adjustable.

In the exemplary circuit given (Figs. 1 and 4), the copper oxide full wave rectifiers $R_{c-1}$, $R_{c-2}$, and $R_{c-3}$ are all alike; that is, they may consist of rectifiers having a $\frac{3}{4}''$ disc, constructed for from 3 to 5 volts alternating current maximum, and for 50 m. a. D. C. maximum.

The other terminals of the rectifier $R_{c-3}$ at 48 and 49 are connected by the conductors 50 and 51, respectively, to the terminals of the relay coil $R_y$. The other two terminals of the rectifier $R_{c-2}$ at 52 and 53 are connected by the conductors 54 and 55, respectively, to the terminals of the control coil $A_2$.

The other terminals 56 and 57 of the rectifier $R_{c-1}$ are connected by conductors 58 and 59, respectively, to the rebiasing coil $B_1$, which is also on the center leg 22 of the core reactor (Fig. 5) in the first stage of Fig. 1. A resistance $R_1$ is shorted across the conductors 58 and 59 of the biasing coil $B_1$ in Fig. 1 of the first stage.

The condensers $C_1$ may consist of a .25 mfd. condenser, and $C_2$ may consist of a 6 mfd. condenser. The amplifier of Fig. 1 has its control coil $A_1$ in the form of a coil of 10,000 turns of No. 40 wire of 2600 ohms resistance. The biasing coil $B_1$ may consist of 500 turns of wire, having a resistance of anywhere between 5 to 20 ohms, for example. The by-pass resistance $R_1$ may be of 10 ohms.

It should be understood that the specific constants of the circuit are given only by way of example and that the characteristics of the elements of the circuit may be varied infinitely, provided they are in proper size and relation to each other.

The operation of this circuit will be described in detail in connection with certain other more simple theoretical circuits and corresponding curves, but the sensitivity of the amplifying circuit of Fig. 1 is indicated by the fact that it is responsive to a current of $2 \times 10^{-7}$ amperes at a voltage of $10^{-3}$ volts. It operates at a relatively lower power input level of $2 \times 10^{-10}$ watts.

Referring to the circuit of Fig. 1, this is peculiarly adapted for a high impedance input. That of Fig. 4 illustrates an amplifier circuit for a low impedance input. The signal input for the circuit of Fig. 1 is at the terminals 1 and 2 into coil $A_1$, which is wound with a fine wire 40 of many thousand turns, such as, for example, 10,000 turns. The great number of ampere turns in this coil increases the efficiency of the circuit, but the circuit offers too great a resistance or impedance, or both for the alternating current component, and therefore the reactor $L_1$ has its biasing coil $B_1$ provided with a path for the alternating current component in the form of the shunt resistor $R_1$ of low resistance.

The resistance $R_2$ is a variable resister for presetting the amplifier to be operated at a predetermined magnitude of input. Terminals 3 and 4 are the terminals for the operating alternating current voltage.

Referring to Fig. 4, it will be observed that this circuit also includes the same energizing terminals 3 and 4, two stages of reactors $L_1$ and $L_2$, having the coils $Z_1$, $Z_2$, $Z_3$, and $Z_4$, $A_1$, $A_2$, and E.

In this case both stages are operated with the same alternating current voltage and the assembly of the rectifier $R_{c-1}$ the reactor $L_1$, and condenser $C_1$ comprising the first or transition stage, while the second stage comprises the rectifier $R_{c-2}$, the reactor $L_2$, and the condenser $C_2$.

The output from the first stage feeds into the second stage, and the output from the second stage operates the relay $R_y$. The connections of the elements of the circuit mentioned are the same as previously described with respect to Fig. 1.

In this case, however, (Fig. 4), the reactor of the first stage has only one Ho-coil, $A_1$, and the necessary bias is derived from the resister $R_4$ in the control circuit, which has its terminals at 1 and 2.

$B_a$ is a biasing battery, and $R_2$ is a variable resistor, the setting of which to different values determines the magnitude which the input must reach before a transition occurs, and the relay operates as described later under the theory of operation.

Figure 2:
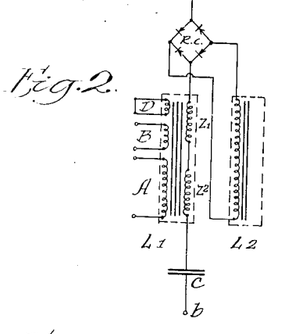
Fig. 2 shows the wiring diagram of a portion of an alternative form of circuit which may be substituted for the first stage of Fig. 1.

Referring to Fig. 2, this illustrates a modification of the first or transition stage of the amplifier. The modification of Fig. 2 differs from that of Fig. 4 in that Fig. 2 has its first reactor stage provided with additional coils. In this case A is the signal input coil, B is the bias coil, and D is a short-circuiting coil, which is included for the purpose of providing a path for the alternating current component when the signal input coil and the biasing coil are of high resistance or contain a high reactive impedance in addition to resistance.

Figure 3:
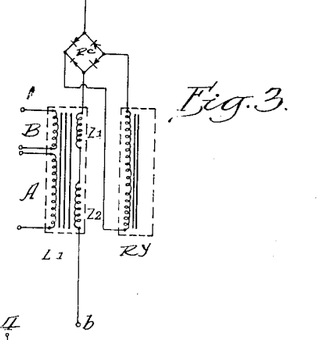
Fig. 3 shows another modification similar to Fig. 2, which may be substituted for the second or relay coupling stage of Fig. 1.

Fig. 3 illustrates a second stage circuit comprising a series reactor circuit without a condenser. This series reactor circuit for the second stage has a biasing winding B on the center leg of the reactor for matching it to the characteristic of the relay $R_y$.

If the output of the first stage is not large enough to operate the relay positively, a plurality of such additional stages (Fig. 3) may be provided to increase the output.

Figure 6:
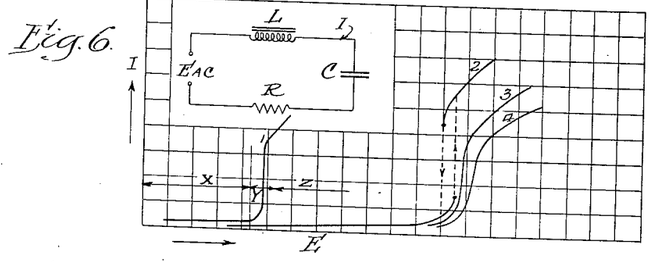
Fig. 6 shows a simple resonant non-linear circuit consisting of resistance, capacitance, and inductance comprising a saturable iron core reactor and the curves for different values of resistance R showing its typical ampere-volt relation.

Referring to Fig. 6, this is a reproduction of the operating curves of a simple resonant, nonlinear circuit, including the resistance R, inductance L, capacitance C, and input terminals to be energized by an alternating current electromotive force indicated at $E_{ac}$, the diagram also being included in the figure.

The inductance in this case comprises one coil which is mounted upon a saturable iron core reactor, and the curves 1, 2, 3, and 4 show the relation between current indicated at I on the ordinate and electromotive force indicated at E on the abscissa for different values of resistance R.

As this provides a simple basis for explanation of the operation of my amplifier, its characteristics will be considered and analyzed for the purpose of making the explanation clear.

Considering the curve 1, X represents the region of the unsaturated condition of the iron core reactor throughout which the current increases in proportion to the increase in electromotive force. Z indicates the range beyond the saturated condition, and Y is the region where, upon increase of voltage the circuit condition becomes unstable and current rises abruptly.

The value of the voltage at which this rise in current occurs is a characteristic of the circuit, and is called the critical voltage. The steepness of the curve representing this current jump or rapid increase is a function of the resistance in the circuit.

The magnitude of this increase of current in the region Y increases with increase of voltage, increase of condenser size or capacity, decrease of resistance, and decrease of impedance of the reactor. If the resistance of the circuit is smaller than the critical resistance, the circuit is unstable and shows a hysteresis effect, as shown in curve 2, where the dotted line at the right shows the increase of current on a rise of electromotive force, and the dotted line at the left, with the arrow pointing downward, shows the decrease of current with a decrease in electromotive force at a different value of the electromotive force.

There are a number of factors in a circuit of the type of Fig. 6, which may be varied, such as the resistance, the impedance of the condenser, or the impedance of the reactor, any of which may be varied while holding the other factors constant. For a given set of conditions there is a critical resistance, a critical impedance of the condenser, or a critical inductive impedance of the iron core reactor.

One of the modes of operation of the invention involves the critical impedance of a saturable iron core reactor utilized in a resonant, nonlinear circuit with the applied voltage, condenser capacity, and circuit resistance held constant for one operating condition, and having as the only variable the impedance of the iron core reactor.

The change of reactor impedance to its critical value is accomplished by means of a superimposed direct current magnetizing force (Ho, expressed in gilbert per cm.) which force constitutes the controlling factor of the reactor impedance or in other words, is the factor to be amplified.

If the volt ampere relation for such a reactor is plotted for different values of direct current saturation, it will be found that increasing direct current saturation decreases the maximum of the reactance, and in turn decreases the permeability also. For large values of alternating current flux densities, which may be indicated by $B_{max}$, the direct current controllability is greatly decreased. For a certain type of iron there is only a limited control range within which the combination of the alternating current flux ($B_{max}$) and the direct current magnetomotive force ($H_0$-coil) produces a maximum change of reactance or reactor impedance with a given change of direct current. This is especially true when the core material used is, as in this case, Allegheny Mu-Metal, which is a nickel-copper-iron alloy of high permeability at low flux densities, and which saturates almost completely in a direct current magnetizing field of $H_0 = 1$ gilbert per cm.

Figure 7:
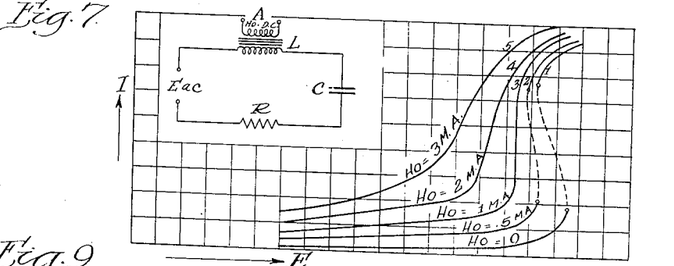
Fig. 7 differs from Fig. 6 in that the iron core reactor is a balanced core reactor similar to that illustrated in Fig. 5, in which D. C. current is superimposed on the reactor as a controlling factor. The curves show the volt-ampere relation for different values of superimposed D. C. current.

Fig. 7 is a reproduction of curves with an exemplary circuit, showing the volt ampere relation for different values of direct current saturation, when such a direct current control reactor is used in a series resonant circuit.

The direct current magnetization or $H_0$ is impressed by means of control winding A (Fig. 7).

For example, the direct current magnetization in curve 1 was zero; in curve 2, .5 m. a.; in curve 3, 1 m. a.; in curve 4, 2 m. a.; and in curve 5, 3 m. a., as indicated on the curves.

It will thus be observed that increasing the direct current saturation or energizing direct current applied to the center leg flattens the curve and shifts it upward and moves the critical voltage, which is indicated by the application of the numeral designating the curve toward the left, for the reason that the effective permeability is reduced or the effective reactance is reduced by direct current saturation at the center leg.

Since the reactor impedance is a function of permeability, it is necessary to ascertain the values of alternating current flux density ($B_{max}$) and direct current saturation ($H_0$) at which the greatest percentage change of permeability may be obtained for a reactor of a given characteristic.

Figure 10:
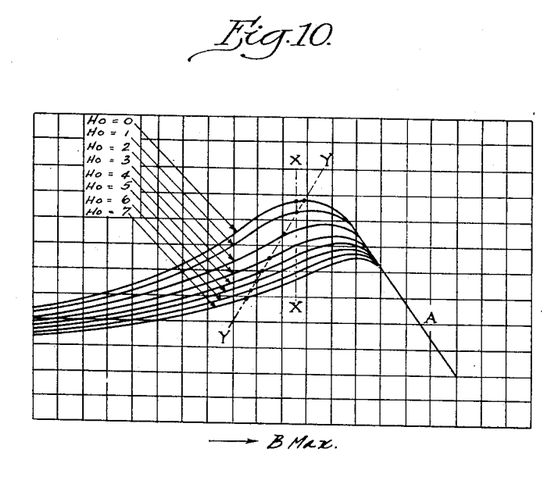
Fig. 10 shows incremental permeability curves for a given reactor made of a certain core material at a given frequency. The curves show the relation between alternating current flux densities ($B_{max}$), D. C. saturation ($H_o$) and alternating current permeability ($M_u$)

The value of the alternating current permeability ($Mu_{ac}$) of a core material, simultaneously subjected to alternating current and direct current magnetization may be expressed through the medium of incremental permeability curves, such as are shown, for example, in Fig. 10. These curves give the relation between alternating current flux density ($B_{max}$), direct current saturation ($H_0$), and alternating current permeability, and $Mu_{ac}$ for a given reactor made of a certain core material at a certain frequency.

It will be noted that the value of the alternating current permeability ($Mu_{ac}$) is lower for the larger values of the direct current saturation ($H_0$) and that the core materials having the highest values of $Mu_{ac}$ of permeability when slightly polarized are subject to the greatest reduction in alternating current permeability by a given small value of direct current saturation.

Referring to Fig. 10, this figure shows a reproduction of curves in which alternating current permeability is plotted on the ordinate against alternating current flux density on the abscissa at various values of direct current saturation. Curves 0 to 7 represent the alternating current permeability curves of the same reactor with different multiple values of direct current saturation. The vertical line XX represents a predetermined alternating current flux density, which is the same at each of the intersections with the curves, and it will be noted that the length of the sections of the line XX between the curves 0 to 7, inclusive, is different at different points.

This indicates that the change in incremental permeability differs at different values of direct current saturation. The largest change occurs between the curves 1 and 2, indicating that the largest change of alternating current permeability for a predetermined amount of change in direct current saturation takes place at the point represented between these two curves; that is, when the reactor is polarized with the direct current saturation of .05 to .10 gilbert per centimeter.

Referring again to Figs. 6 and 7, the unconventional volt ampere relations which are found in such series resonant circuits are due to the combined action of the saturation of the iron in the reactor and the resonance of the circuit. Maximum sensitivity and maximum change of current or change in voltage will be obtained when a maximum change, or more precisely, a maximum decrease of alternating current permeability by a given change in direct current saturation, coincides with the resonance of the circuit.

Since the incremental permeability curves (Fig. 10) show that a reactor which is polarized slightly with direct current gives the largest change of permeability with a small change of direct current saturation, a very sensitive controlling circuit may be provided by bringing the reactor up to this sensitive operating range by means of another coil, such as a biasing coil.

The characteristics of the biasing coil are so selected that the reactor will be operating within the sensitive operating range desired. It is for this purpose that the circuit of Fig. 1 has its reactor $L_1$ provided with the biasing coil $B_1$. The coil $A_1$ is the control or signal input coil, and the control input represents an increment of change of the direct current saturation current, which may be indicated by the symbol $\Delta H_0$.

The coil $B_1$ is the biasing coil, which maintains the direct current saturation of the reactor at the predetermined value which is necessary for greatest sensitivity.

Figure 8:
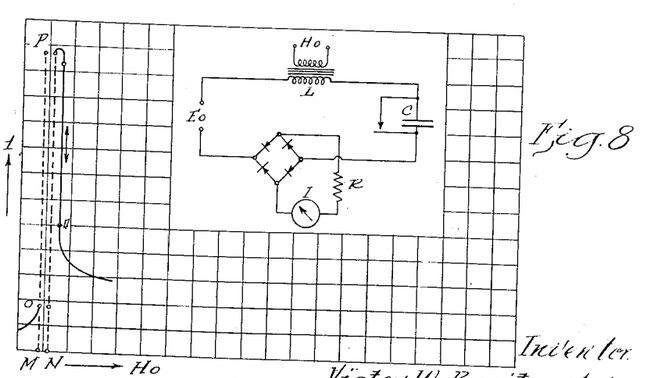
Fig. 8 shows an operating circuit embodying the invention, with curves showing the relation between direct current input in gilberts per cm. to current output.

Fig. 8 shows a series resonant circuit operated with constant voltage, and the reactor is controlled by direct current saturation coils. The curves are reproductions of curves which show the relation between the current output and the D. C. saturation or current input.

The operating conditions and ranges for the material used in this circuit, that is, Allegheny Mu-Metal, are as follows.

The flux density is from 1500 to 3,000 gausses. The direct current magnetizing force or $H_0$ is from .05 to .1 gilbert per centimeter. The sensitivity or increment of direct current saturation equals .0001 to .0002 gilbert.

Figure 9:
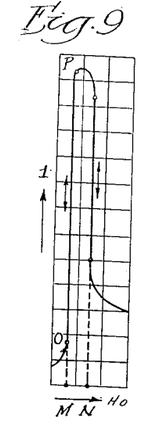
Fig. 9 shows an operating curve for the circuit of Fig. 8, operated at a higher alternating current voltage.

The curves of Figs. 8 and 9 show what takes place in the circuits embodying my invention when the reactor is suitably biased for predetermined saturation and operated by the application of additional increments of saturating direct current.

With no direct current saturation the permeability of the reactor is high, and therefore the impedance of the reactor is too high to be in resonance with the selected condenser $C_1$.

As the direct current is slowly applied according to the curves in Figs. 8 and 9, the reactor impedance decreases and the current I increases slowly. The point O on the curve is the magnitude on the critical $H_0$, and if the additional increment of direct current is applied in the same sense, the current jumps up to the point P on the curve and breaks out in oscillations within the shaded area of Fig. 8, which oscillations are continued as long as the cumulative saturating direct current is between the points N and N in value.

If the saturating current is again reduced to a value smaller than the value 0, oscillation ceases. The oscillation is a 60-cycle-modulated, low frequency, and may be suppressed by increasing the resistance R of the resonant circuit to a value greater than the critical resistance, or by the use of a resistor in the $H_0$ control circuit. This, however, decreases the sensitivity of the resonant circuit considerably. If the saturating direct current is further decreased, the current will drop rapidly from the point 3 to the point 4.

As the present operating circuits may be operated under a number of different conditions, I shall call the conditions just described operating conditions No. 1, or Case No. 1.

There are four different operating conditions for utilizing my invention under different conditions, which I shall designate as operating conditions Nos. 1-4, inclusive, or Cases Nos. 1-4, inclusive.

In order to attain operating conditions No. 2, or Case No. 2, the circuit is operated at a higher alternating voltage, resulting in increased $B_{max}$, whereupon the application of a smaller combined $H_0$ than in Case No. 1, the current jumps up to the point P, but does not break out in oscillations, and stays there as long as the $H_0$ plus the increment of $H_0$ is applied to the saturation windings.

If the $H_0$ is reduced to less than its critical value, this reduces the current again to its starting value (point O). This circuit also works in a reverse direction, that is, if the reactor is bia 1 to its critical value, so that current will be at maximum (point P in Fig. 8), and if $H_0$ is reduced by an increment of $H_0$ or a small increment of $H_0$ is applied to the control winding of opposing polarity, opposing the biasing $H_0$ of the reactor, the current I drops to the point O as long as the increment is applied.

After removing the increment of $H_0$, current increases again to the point P.

The operating conditions just described will be referred to as operating conditions No. 2, or Case No. 2.

Beginning with the conditions of Case No. 2, if $B_{max}$ is increased by a small amount and the circuit is operated with a smaller critical $H_0$, than in the previous case (No. 2), a new set of operating conditions is obtained, which I shall refer to as Case No. 3.

Referring again to Fig. 8, the reactor is biased with an $H_0$ of the value of a little less than the point M, and the current stays at the point O on the curve. By applying an increment of $H_0$ in the same sense as the biasing $H_0$, the current jumps to the point P on the curve, and stays there, even after the increment has been removed.

It is only by the application of an impulse of about the same magnitude, but opposing polarity, to the biasing $H_0$, that the current will return to the point O, at which it stays after the increment of $H_0$ has been withdrawn. The current output will stay at its last position on the curve, as caused by the last impulse of correct polarity.

If the current is at the point O on the curve a positive impulse with respect to the biasing $H_0$ will change the output current to the point P on the curve, while a negative increment of $H_0$ will have no effect. At the point P on the curve, the circuit will be responsive only to an impulse of negative incremental $H_0$ and will be unaffected by a positive incremental $H_0$ (Case 3).

Cases 2 and 3 are operated at a critical alternating voltage or a critical $B_{max}$, while for Cases 1 and 4 the circuit may be operated within a wide range of different voltage values.

Beginning with the conditions of Case 3, if the applied alternating voltage is increased still further and a still smaller $H_0$ is applied, the circuit may then be operated under the conditions of Case No. 4. The output current will then jump up to the point P in Fig. 9, but does not break out in oscillations, and stays there, even if the increment of $H_0$ has been removed. Bringing the $H_0$ entirely back to zero will not change the magnitude of the output current I.

To restore the output current to its starting value, 0, again, under the operating conditions of Case 4, the condenser C has to be short circuited or the terminal voltage interrupted for a short instant.

Referring to Fig. 4, all of the four operating conditions, Cases 1-4 may be realized by the use of this circuit and by the use of a constant applied alternating voltage, instead of varying the A. C. voltage.

Referring to the first stage, it will be seen in Fig. 4 that a variable resistor $R_3$ is connected across the condenser $C_1$. This resistor $R_3$ determines the voltage applied across the condenser, and also changes the voltage applied to the reactors $Z_1$ and $Z_2$. Thus the alternating current flux, due to the reactors $Z_1$ and $Z_2$, may be varied by adjusting the resistor $R_3$ to one of the four operating conditions just described.

It is, of course, also necessary in the adjustment of the circuit of Fig. 4 to make an adjustment of the resistor $R_2$, which makes a suitable change in the biasing for the operating conditions desired.

My explanation of the theory or principles involved in the operation of my invention follows.

Such series resonant circuits never break out in oscillations when there is no $H_0$ or direct current saturation applied to the center leg of the reactor.

Considering Fig. 5, which shows the reactor used in such circuits, single arrows represent the induced alternating current flux, and double arrows the steady or direct current flux produced by the biasing and control windings.

Considering one instant where for one-half of a cycle these two fluxes are in the same direction in one-half of the reactor, while opposing in the other half. For the next half of the cycle, the reversed condition takes place. These flux differences of the two halves of the reactor must flow through the center leg, thereby inducing a voltage in the control and biasing windings.

Considering the fact that the two halves of the reactor are exposed to a superimposed alternating current flux on a unidirectional flux in an easily saturable core material, it is obvious that the maximum flux peaks are flattened and distorted as the core material is considerably saturated by this flux magnitude in one-half of the reactor, where both fluxes are in the same direction, while the other half is only subjected to the difference of the two fluxes, and no distortion takes place. Therefore, the amplitudes of the sine wave are not symmetrical any more.

The same condition is obtained as in a frequency doubling or tripling transformer, where the method of producing harmonics of the fundamental frequency is used, and the operating principle depends on the assymetric variation of inductance with current, when an iron core is saturated.

The magnetizing curve forms a non-linear characteristic, and use is made of this non-linearity to obtain second and higher harmonics.

Figure 11:
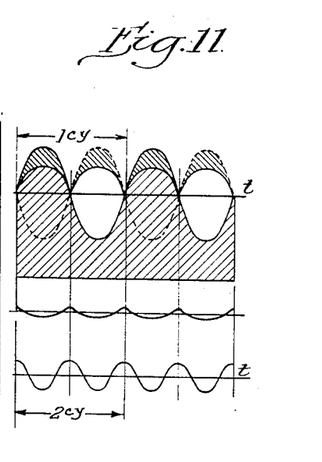
Fig. 11 shows the frequency doubling effect which takes place in the reactor due to the unsymmetrical flux conditions when a unidirectional flux is superimposed on the alternating flux in a balanced, saturated, core reactor.

Therefore, the induced current in the biasing and control windings, due to the unbalance of the flux condition and its linkage in the center leg of the reactor, will have double the frequency of the fundamental or impressed voltage, as verified by the use of a cathode ray oscillograph and illustrated in Fig. 11.

The control and biasing coil circuits are now in the transformer relation and, if of low resistance, act as shorted secondaries. Investigation has shown, however, that there is no gradually increasing flow of the alternating current component of double the frequency when $H_0$ is increased. There is a trigger action involved, and this alternating current flows only and starts abruptly when $H_0$ is increased to its critical value, initiating the transition or the start of oscillations.

The fact has to be considered that with only a trace of $H_0$ impressed into the control coil, the center leg of the reactor carries practically no alternating current flux at all, only uni-directional flux, while the rest of the core carries the same uni-directional flux plus the superimposed alternating flux of comparatively high density, resulting in an incremental permeability (Fig. 10) corresponding to a point somewhere on the inclining branch of the curve representing a given $H_0$.

The conditions, however, are different in the center leg of the reactor when, with an incresing $H_0$ the alternating flux unbalance starts gradually to build up in the center leg, and the flux linkage, with the control and biasing windings, induces the alternating current component of double the frequency of the fundamental.

This alternating flux is first small for smaller values of $H_0$, and together with uni-directional flux, resulting in incremental permeability corresponding to a point on the permeability curve which is now on the left side of the peak value, or where a further increase of alternating current flux or $B_{max}$ results in a rapidly increasing permeability, and in turn also a higher reactive impedance, thus preventing the flow of the alternating current component in the control and biasing circuit.

This choking effect acts as a very efficient brake for the flow of the induced voltage of the double frequency. This effect accounts for the trigger action control in those circuits. As $H_0$ is further increased, the flux unbalance in the center leg or $B_{max}$ increases also, moving the incremental permeability towards the right closer to its maximum. Before it reaches its peak value, there is the critical value of $H_0$, whereupon a further increase, with incremental $H_0$, the transition is initiated, and takes the following course. The break-down or transition is initiated in the center leg of the reactor with an increase of $H_0$ beyond its critical value, therefore increasing the flux unbalance higher $B_{max}$, with incremental permeability towards the right, but which is now sharply decreasing with increasing $B_{max}$, therefore decreasing the reactive impedance with more current flow for the alternating current component of the double frequency in the $H_0$ circuit, which is of low resistance and acts as a shorted secondary.

This violent and abrupt flux increase in the center leg induces a direct current component of considerable magnitude in the $H_0$ circuit, which is of the same polarity as $H_0$ and helps the transition along.

This increase of $H_0$ reduces the incremental permeability in the rest of the reactor with a decrease of the impedance, thus the circuit falls into resonance with a considerable increase of current I (Fig. 8). As the transition gains momentum, a tremendous flux increase takes place in the center leg. The flux linkage with the $H_0$ coil, which is a circuit of low resistance, determines largely the length of the transition, and according to Lenz' law, the rapid flux change in the center leg sets up an E. M. F. in the $H_0$ coil, causing an opposing flux, which tends to retard the change.

Fig. 8 shows the now performed transition from point O to P, and the current I is now only limited by the D. C. resistance of the resonant circuit. Point P, however, is unstable for Case No. 1, where the circuit is operated at a lower voltage, or the reactor at a lower $B_{max}$. Current I will stay at P as long only as the induced E. M. F. in the $H_0$ coil caused by the abrupt flux, which is in the center leg, is effective. As soon as the E. M. F. dies out, the current I restores to point O, and if $H_0$ is still larger than its critical value, the second transition gets started, and so on, and the circuit oscillates indefinitely until $H_0$ becomes smaller than its critical value.

Figure 12:
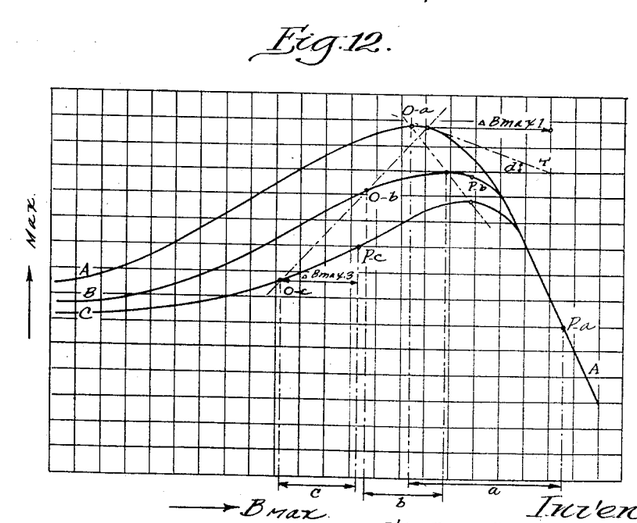
Fig. 12 shows three curves of the type of Fig. 10 used to illustrate conditions.

Referring to Fig. 12, this shows three of the incremental permeability curves of Fig. 10, with certain points marked on the curves, for the purpose of explanation. $O_a$, $O_b$, and $O_c$ are the critical permeabilities for different values of $H_0$ and its respective $B_{max}$. If this circuit is operated on a lower voltage and lower $B_{max}$ and $H_0$ as represented by curve C, this circuit will oscillate as Case 1, with a change of $B_{max}$ between points $O_c$ and $P_c$. By increasing $B_{max}$ and decreasing $H_0$, this circuit is operated now on curve B. Transition will start at the $B_{max}$ corresponding to point $O_b$ and will move to point $P_b$, but since this point is already on the declining branch of the permeability curve, this is a stable point, and it will stay here and lock in even if $H_0$ has been reduced to a smaller than its critical value (Case 4).

Cases 2 and 3 will have their permeability curves somewhere between B and C, very close together, and the points P merely at the peaks of their respective incremental permeability curves.

Curve A represents permeability curve with $H_0$ at zero or no direct current superimposed on the reactor. If the voltage across the circuit is slowly increased that a $B_{max}$ is produced in the reactor corresponding to point $O_a$ on the curve A which is its critical value and $B_{max}$ is now a little more increased beyond this point by increasing the voltage or superimposing an incremental $H_0$, transition takes place to point $P_a$ and the circuit locks in.

T is the tangent to the curve A at $O_a$ or the slope of the critical permeability, and any point to the right on the declining branch of this permeability has a steeper tangent, is therefore unstable, and current will increase with decrease of permeability, along the common declining branch of the permeability curve. The current will be limited only by the D. C. resistance of the circuit.

The mechanical analogy of a block on an inclined plane of changing inclination will explain this condition where the reactor inductance represents a mass having inertia, and the D. C. resistance of the circuit is the friction between the block and the inclined plane. As this resistance is reduced, the slope of the tangent becomes smaller, and point $O_a$ moves toward the peak of the curve. This explains also the apparent hysteresis effect in the critical region, as shown in Fig. 6, curve 2, where in a resonant circuit the resistance has been reduced to less than its critical value. Transition in this critical region is indicated by broken lines. In this unstable region the slope $\Delta E/\Delta I$ of the curve becomes negative; or, in other words, the voltage decreases with increase of current, designated as unstable, since it is a normally physically unattainable condition.

Fig. 7 illustrates the volt-ampere relation of a resonant circuit for different values of $H_0$ superimposed on the reactor. Curves 1 and 2 are indicating clearly this unstable region, shown as broken lines, in which voltage decreases with increase of current.

The present amplifier is adapted to amplify very minute impulses of low impedance sources, such as those encountered in temperature control, pyrometry, radiant energy sources, photocells of the self-generating type in calibrated circuits, railroad or other traffic signaling, telemetering, remote controls, etc.

The amplifiers constructed according to the present invention are of rugged construction without moving parts (delicate or critical) and without tubes or other replaceable parts which always necessitate readjustments as well as replacements.

It is very small and compact in construction and uses for its operation a negligible amount of power and it maintains its high sensitivity and stability practically throughout its full life.

The amplifiers are unaffected by vibration and shocks and may be used in any position so that they are adapted to be used on ships, trains, aeroplanes or other moving vehicles with the same dependable performance. The amplifier acts with a trigger action upon receipt of the signal input or if the signal input rises to the magnitude at which response is desired, so that the relay used need not be critical as in the case of thermionic amplifiers which act only on a marginal change of current.

So far as I am aware, the minimum input power level of magnetic amplifiers of the prior art is about 50 microwatts or $5\times10^{-5}$ watts. Thus the amplifiers of the prior art could not be directly connected to a thermocouple. Therefore, the magnetic amplifiers of the prior art could not be used for temperature control systems utilizing a thermocouple, or for applications of similar low power levels.

The amplifiers constructed according to the present invention are responsive to a change of input power level of about $5\times10^{-11}$ watts; that is they are about one million times as sensitive as the magnetic amplifiers of the prior art. Of the foregoing amplification, a power amplification of $5\times10^6$ is accomplished in the first stage, while the second stage acts as a non-critical matching stage for coupling the first stage to a rugged telephone type relay. This increases the total power amplification up to the relay to $2\times10^8$. This, of course, does not take into consideration the current which the relay itself is able to control.

The total power consumption of the complete amplifier is about .2 watt, 60 cycle supply.

In terms of current the sensitivity of the amplifier is one to three micro-amperes, or in voltage ten to fifty micro-volts in a ten to twenty ohm circuit. It is thus amply sensitive to control a furnace within 5 to 10° F. or better in any range with a standard thermocouple.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A sensitive relay controlling circuit, comprising a pair of saturable core reactors, each reactor having an easily saturable core and each reactor having a pair of balanced windings connected in series with a capacitive reactance to provide a resonant circuit, a source of alternating current for energizing said balanced windings, and an output circuit for each reactor, each output circuit being connected to a rectifier bridge in series with the balanced windings of each reactor, the output circuit of the first reactor being connected to a direct current winding on the second reactor and the output circuit of the second reactor being arranged and constructed for connection to a relay adapted to be actuated by a current within a predetermined range, a direct current controlling coil on the first reactor, and a biasing coil on the first reactor, said biasing coil having a current level adapted to decrease the reactance of the balanced winding circuit of the first reactor to a critical point immediately adjacent to resonance, whereby the application of a direct current increment of $5\times10^{-10}$ watts power level brings the latter circuit into resonance and into low frequency oscillation with a relatively large, non-linear oscillating output current, the said output current being amplified proportionally in the second reactor output circuit, to produce an oscillating current input for the relay, having a range with a margin of safety with respect to the upper and lower operating current limits of the relay.

2. An electrical trigger control circuit operable responsive to a controlling input power level of $5\times10^{-10}$ watts, comprising a saturable core reactor, having an easily saturable core, a pair of balanced coils energized with current at a predetermined alternating potential, a biasing coil on said core energized with a predetermined direct current potential to provide a magnetomotive force of .05 to .1 gilbert per centimeter, the said balanced coils, core, and alternating current potentials being constructed and arranged to operate at a flux density of from 1500 to 3000 gausses, a controlling coil on said core arranged and constructed to operate at an applied controlling direct current potential to effect a change of magnetomotive force of from .001 to .002 gilbert, a capacitive reactance in series circuit with said pair of balanced coils of predetermined capacity, adapted to effect resonance in said circuit upon application of said controlling direct current potential, whereby a non-linear amplification of the magnitude of $5 \times 10^6$ is effected with an input power level of less than $5 \times 10^{-10}$ watts.

3. An electrical trigger control circuit according to claim 2, which also includes a proportional amplifier stage, said latter stage including a saturable core reactor having a similar core, and balanced coils energized with an alternating potential in series with a capacitive reactance and having an input coil on said core, said latter balanced coils, input coil and core being arranged and constructed to effect a linear amplification of the oscillating current input to said second proportional stage to a total amplification of more than $2 \times 10^8$, for operating a current actuated member.

VICTOR W. BREITENSTEIN.